United States Patent [19]
Lee

[11] Patent Number: 6,067,123
[45] Date of Patent: May 23, 2000

[54] MONITOR OUTPUT DEVICE IN HIGH-DEFINITION TELEVISION

[75] Inventor: Kab-Keun Lee, Kyonggi-do, Rep. of Korea

[73] Assignee: Samsung Electronics Co., Ltd., Kyungki-Do, Rep. of Korea

[21] Appl. No.: 09/081,944

[22] Filed: May 21, 1998

[30] Foreign Application Priority Data

May 30, 1997 [KR] Rep. of Korea ................. 97-21850

[51] Int. Cl.[7] ............................................. H04N 3/27
[52] U.S. Cl. .......................... 348/554; 348/555; 348/706
[58] Field of Search ................................ 348/553–558, 348/445, 441, 446, 705, 706; H04N 7/01, 11/20, 3/27

[56] References Cited

U.S. PATENT DOCUMENTS 5,353,065  10/1994  Katsumata et al. ................. 348/556
5,361,099  11/1994  Kim ........................................ 348/555
5,555,097   9/1996  Joung et al. ........................... 348/445

Primary Examiner—Michael H. Lee
Attorney, Agent, or Firm—Sughrue, Mion, Zinn, Macpeak & Seas, PLLC

[57] ABSTRACT

A monitor output device in an HDTV. The monitor device includes an HD decoder, a format converter, an HD/NTSC converter, and luminance and color output terminals for monitor output. The HD decoder decodes an HD signal of an HDTV broadcast which has been channel-selected and converted to a baseband signal, and outputs an HD video signal. The format converter converts the HD video signal of the HD decoder to an output color signal of a predetermined display type. The HD/NTSC converter converts the output color signal of the format converter to analog NTSC luminance and color signals, and outputs the luminance and color signals to the luminance output terminal and the color output terminal, respectively.

9 Claims, 2 Drawing Sheets

MONITOR OUTPUT DEVICE IN HIGH-DEFINITION TELEVISION

BACKGROUND OF THE INVENTION

1. Field of the Invention

The present invention relates to an HDTV (High-Definition Television), and in particular, to a device for outputting a TV broadcasting reception signal to a monitor output terminal. This application is based on Korean Patent Application 21850/1997 which is incorporated herein for all purposes.

2. Description of the Related Art

The main function of an HDTV under development is to receive an HDTV broadcast so that a user can view the broadcast. During the early stage of HDTV broadcasting, TVs using an established broadcasting system such as NTSC (National Television System Committee) will be more popular than HDTVs, and NTSC-VTRs (Video Tape Recorders) will still be used.

Therefore, there is a need for allowing a user to view an HDTV broadcasting program through an HDTV and record the program in an NTSC-VTR by connecting the NTSC-VTR to the HDTV.

SUMMARY OF THE INVENTION

The object of the present invention is to provide a monitor output device in an HDTV, for enabling an HDTV program to be recorded in an NTSC-VTR.

To achieve the above object, there is provided a monitor output device in an HDTV. The monitor device includes an HD-decoder, a format converter, an HD/NTSC converter, and luminance and color output terminals for monitor output. The HD decoder decodes an HD signal which was channel-selected and converted to a baseband signal according to a received HDTV broadcast, and outputs an HD video signal. The format converter converts the HD video signal output by the HD decoder to an output color signal of a predetermined display type. The HD/NTSC converter converts the output color signal of the format converter to analog NTSC luminance and color signals, and outputs the luminance and color signals to the luminance output terminal and the color output terminal, respectively.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE PREFERRED EMBODIMENT

A preferred embodiment of the present invention will be described in detail, referring to the attached drawings. Many specific details including specified circuit components and procedures are disclosed for more comprehensive understanding of the present invention. As will be readily appreciated by anyone skilled in the art, the present invention can be implemented without these details. In addition, a detailed description of known function and structure of the present invention will be avoided if it is deemed to obscure the subject matter of the present invention.

Figure 1:
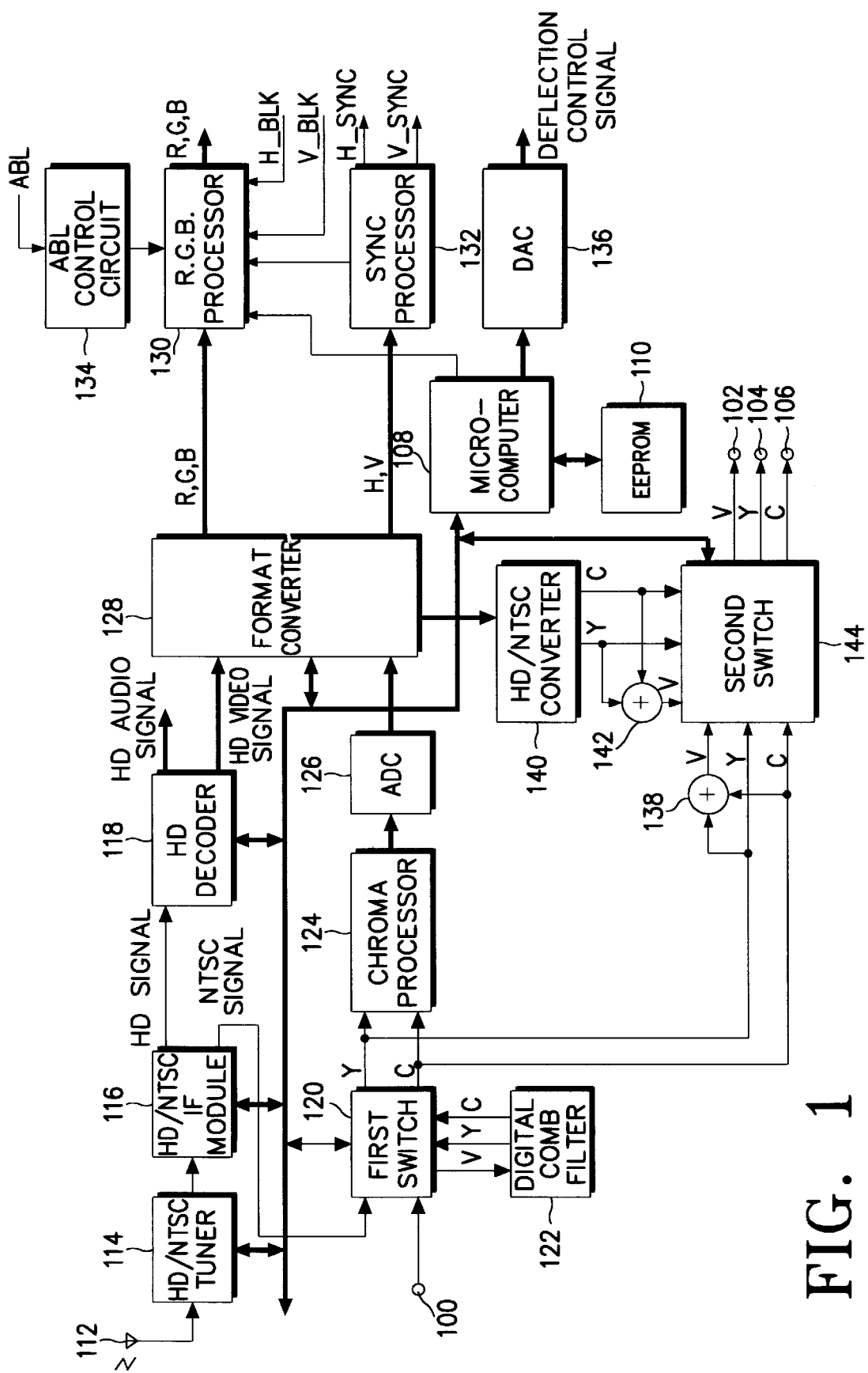
FIG. 1 is a block diagram of an HDTV having a monitor output device according to an embodiment of the present invention.

FIG. 1 is a block diagram of an HDTV having a monitor output device according to an embodiment of the present invention. In FIG. 1, the HDTV for compatibly receiving an NTSC-TV broadcast is constituted in such a way that monitor output terminals 102, 104, and 106 are provided to output an NTSC video signal, an HD/NTSC converter 140 and first and second mixers 138 and 142 are added, and a microcomputer 108, which is an HDTV controller, controls first and second switches 120 and 144. This HDTV is composed of general circuits and ICs (Integrated Circuits) and controlled by the microcomputer 108 according to a viewing mode selected by a user. In the present invention, viewing modes are an NTSC-TV mode for NTSC-TV broadcasting, an HDTV mode for HDTV broadcasting, and an external input mode for receiving an external input video signal for viewing.

During the initial stages of HDTV broadcasting, earlier formats for TV broadcasting, such as the NTSC-TV format, will continue to be used for some time, and early HDTVs will be manufactured to be compatible with the NTSC format. An example of an HDTV receiver compatible with NTSC-TV broadcasting is shown in FIG. 1. The HDTV of FIG. 1 also enables reception of an external input video signal as well as HD and NTSC signals. An audio processor is not shown in FIG. 1 for simplicity.

Referring to FIG. 1, an external input terminal 100 is used to receive an external video signal other than HD and NTSC signals. The external input terminal 100 can receive NTSC composite video and supervideo signals. The monitor output terminals are a composite video output terminal 102 for outputting an NTSC composite video signal V, a luminance output terminal 104 for outputting an NTSC luminance signal Y, and a color output terminal 106 for outputting an NTSC color signal C.

An HD/NTSC tuner 114 selects a channel using either the HD format or the NTSC from signals received via an antenna 112, corresponding to a present viewing mode under the control of the microcomputer 108, and outputs the channel-selected signal as an IF (intermediate Frequency) signal to an HD/NTSC IF module 116. Then, the HD/NTSC IF module 116 converts the received signal to a baseband signal, and outputs the baseband signal to an HD decoder 118 if the baseband signal is an HD signal, or to a first switch 120 if the baseband signal is an NTSC signal.

The HD decoder 118 decodes the received baseband HD signal, and outputs digital HD audio and video signals. The HD audio signal is applied to and processed in an audio processor not shown. The HD video signal is applied to a format converter 128.

The first switch 120, connected to a digital comb filter 122, is generally an A/V (Audio/Video) switch. The digital comb filter 122 separates an input analog NTSC composite video signal V into the luminance signal Y and the color signal C. The first switch 120 selectively receives either the NTSC signal from the HD/NTSC IF module 116 or an analog composite video or supervideo signal from the external input terminal 100 under the control of the microcomputer 108 according to the present viewing mode. Upon input of the NTSC signal or the composite video signal, the digital comb filter 122 separates the input signal into the luminance signal Y and the color signal C, and the first switch 120 outputs the signals Y and C. Upon input of the supervideo signal, the first switch 120 simply outputs the luminance and color signals Y and C of the supervideo signal because in the supervideo signal the luminance and color signals Y and C are separated. The luminance signal Y and the color signal C are applied to a chroma processor 124, the first mixer 138, and the second switch 144.

The chroma processor 124 converts the luminance and color signals Y and C to an output color signal for driving a CRT (Cathode Ray Tube). The output color signal is made up of primary color signals R, G, or B, or color difference signals Y, R-Y, or B-Y. In the example, the output color signal is made up of primary color signals. An analog/digital converter (ADC) 126 converts the output color signal received from the chroma processor 124 to a digital signal, and applies the digital signal to the format converter 128.

The format converter 128 receives one of the outputs of the HD decoder 118 and the ADC 126 under the control of the microcomputer 108 according to the present viewing mode, and converts the received signal to a signal having primary color signals R, G, or B of a predetermined display type. The display type may be set to a horizontal frequency of 33.75 kHz and a vertical frequency of 60 Hz, for example. This format converter 128 generally has a format converter IC, a memory, a timing generator, and a digital/analog converter (DAC). The format-converted primary color signal is applied to an R.G.B. processor 130 and an HD/NTSC converter 140, and corresponding horizontal and vertical sync signals H and V are applied to a sync processor 132.

The HD/NTSC converter 140 converts the output color signal of the format converter 128 to the luminance signal Y and color signal C of the analog NTSC signal, and outputs the luminance and color signals Y and C to the second mixer 142 and the second switch 144.

The first mixer 138 mixes the luminance signal Y and the color signal C received from the first switch 120, and outputs a composite video signal V to the second switch 144. The second mixer 142 mixes the luminance and color signals Y and C received from the HD/NTSC converter 140, and outputs the composite video signal V to the second switch 144.

A general A/V switch is used as the second switch 144. The second switch 144 selects one of the outputs of the first and second mixers 138 and 142 under the control of the microcomputer 108 according to the present viewing mode, and outputs the selected signal to the composite video output terminal 102, the luminance output terminal 104, and the color output terminal 106.

Meanwhile, the R.G.B. processor 130 receives the primary color signal R, G, or B from the format converter 128, horizontal and vertical blanking signals H_BLK and V_BLK from a picture tube deflection circuit (not shown), and a sync signal from the sync processor 132, and adjusts contrast, brightness, and white balance of a display by means of the primary color signal R, G, or B under the control of the microcomputer 108. At this time, an automatic brightness limit (ABL) circuit 134 ABL-controls a signal processed in the R.G.B. processor 134 by an ABL signal ABL applied from the deflection circuit of the picture tube. Pictures are displayed by driving the picture tube with the primary color signal R, G, or B received from the R.G.B. processor 130. The sync processor 132 converts the horizontal and vertical sync signals H and V received from the format converter 128 to predetermined horizontal and vertical sync signals H_SYNC and V_SYNC, and outputs the horizontal and vertical sync signals H_SYNC and V_SYNC to the deflection circuit of the picture tube and a clamp signal to the R.G.B. processor 130. The DAC 136 converts deflection control data received from the microcomputer 108 to an analog deflection control signal, and applies the analog deflection control signal to the deflection circuit of the picture tube.

Processing in the HD/NTSC tuner 114, the HD/NTSC IF module 116, the HD decoder 118, the format converter 128, the R.G.B. processor 130, and the deflection circuit of the picture tube, and switching in the first and second switches 120 and 144 are controlled by the microcomputer 108 according to the present viewing mode. Control data for the control operation of the microcomputer 108 depending on a viewing mode, that is, image quality adjustment data and deflection control data, are stored in an EEPROM (Electrically Erasable and Programmable ROM) 110, and supplied to the microcomputer 108.

The HDTV of FIG. 1 as constituted above is operated as follows, depending on a viewing mode. In an NTSC-TV mode, the HD/NTSC tuner 114 selects an NTSC channel under the control of the microcomputer 108, a corresponding IF signal is applied to the HD/NTSC IF module 116, and a baseband NTSC signal is output to the first switch 120. Here, the NTSC signal is a composite video signal. Then, the first switch 120 applies the NTSC composite video signal V to the digital comb filter 122 under the control of the microcomputer 108, and the NTSC composite video signal is separated into the luminance signal Y and the color signal C. The separated luminance and color signals Y and C are applied to the chroma processor 124, and converted to the primary color signal R, G, or B in the chroma processor 124, converted to a digital signal in the ADC 126, and applied to the format converter 128. The format converter 128 converts the received primary color signal R, G, or B to the predetermined display type under the control of the microcomputer 108. Then, the converted primary color signal R, G, or B is applied to the R.G.B. processor 130, and the corresponding horizontal and vertical sync signals H and V are output to the sync processor 132.

The sync processor 132 converts the horizontal and vertical sync signals H and V to horizontal and vertical sync signals H_SYNC and V_SYNC in predetermined forms, and the clamp signal is output from the R.G.B. processor 130. At this time, the R.G.B. processor 130 adjusts picture quality under the control of the microcomputer 108, and outputs the analog primary color signal R, G, or B. ABL control is simultaneously performed by the ABL circuit 134. The primary color signal R, G, or B is received by the cathode of a picture tube from the R.G.B. processor 130 via a final output amplifying terminal. This allows pictures of NTSC-TV broadcasting to be displayed on a screen.

In the HDTV mode, an HD signal for HDTV broadcasting is received and channel-selected in the HD/NTSC tuner 114, passes through the HD/NTSC IF module 116, is decoded in the HD decoder 118, and applied to the format converter 128. Then, the format converter 128 converts the signal in a predetermined format under the control of the microcomputer 108 as described above. The subsequent procedures are implemented in the same manner as that for the NTSC-TV mode, and pictures are displayed according to the HDTV broadcasting.

In the external input mode, the first switch 120 selectively receives a signal from the external input terminal 100 under the control of the microcomputer 108. Here, when a video composite signal is input, it is separated into the luminance signal Y and the color signal C in the digital comb filter 122. When a supervideo signal is input, the luminance and color signals Y and C of the supervideo signal are simply output.

The luminance signal Y and the color signal C are applied from the first switch 120 to the chroma processor 124. The other subsequent procedures are implemented in the same manner as that for the NTSC-TV mode, and then pictures are displayed from the external input signals.

Figure 2:
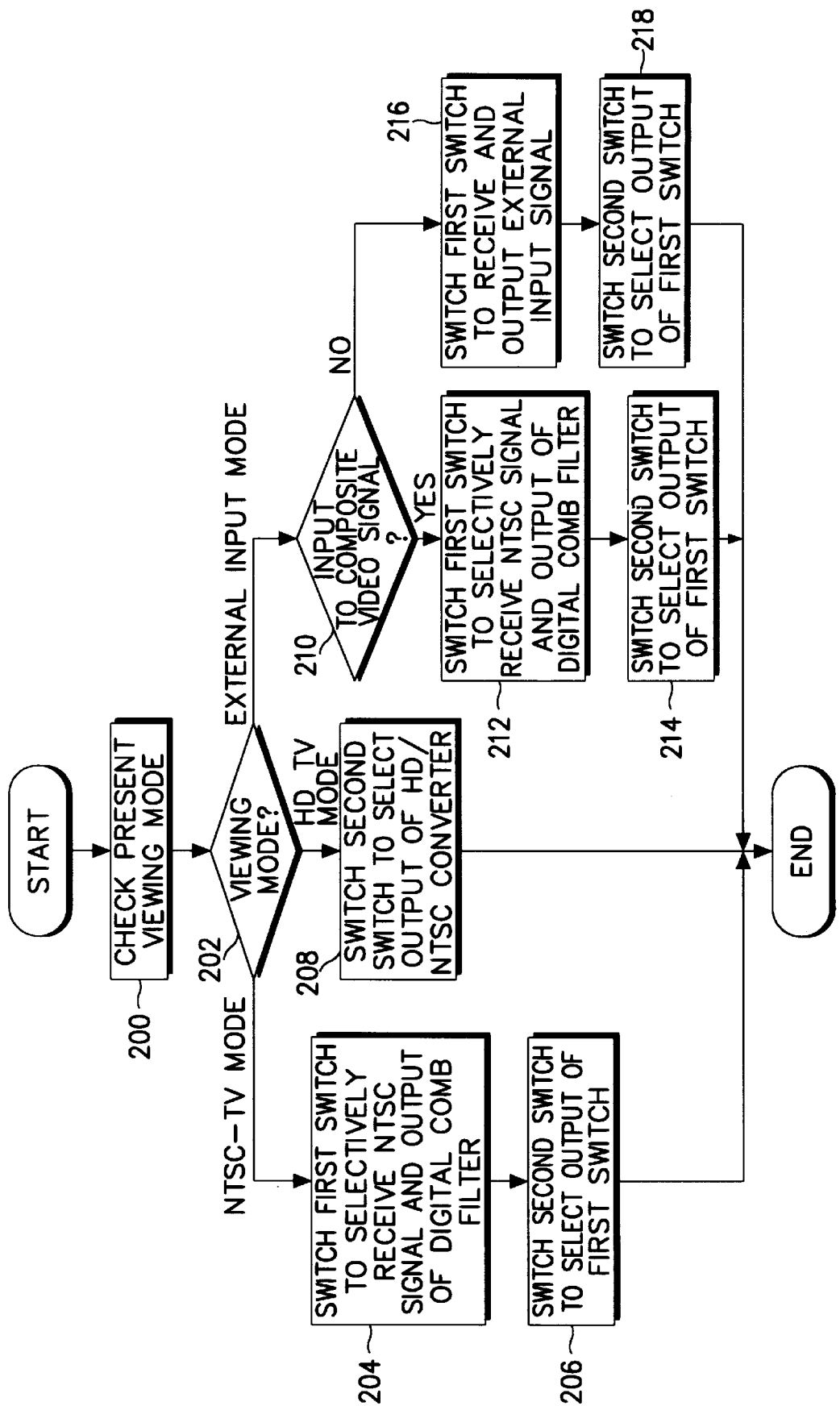
FIG. 2 is a flowchart of a process implemented in a microcomputer of FIG. 1 according to the embodiment of the present invention.

FIG. 2 is a flowchart of a process implemented in the microcomputer 108 according to the embodiment of the present invention. In the drawing, a monitor output procedure related to the present invention among control operations of the microcomputer 108 is shown together with control of the first and second switches 120 and 144 depending on three viewing modes.

The monitor output process depending on the three viewing modes in the HDTV of FIG. 1 according to the present invention will be described in detail, referring to FIG. 2. When power is on or a viewing mode is changed, the microcomputer 108 checks a present viewing mode, in steps 200–202. If the present viewing mode is an NTSC-TV mode, the microcomputer 108 performs steps 204–206, if it is an HDTV mode, the microcomputer 108 performs step 208, and if it is an external input mode, the microcomputer 108 performs steps 210–218.

In step 204, the microcomputer 108 controls the first switch 120 to receive the NTSC signal from the HD/NTSC IF module 116 and select the output of the digital comb filter 122. Because the present viewing mode is the NTSC-TV mode, the first switch 120 outputs the luminance signal Y and color signal C separated from the NTSC signal for the NTSC-TV broadcasting. The separated luminance signal Y and color signal C are applied to the first mixer 128 and the second switch 144. The first mixer 120 mixes the received luminance signal Y and color signal C into the composite video signal V, and outputs the composite video signal V to the second switch 144. In this state, the microcomputer 108 switches the second switch 144 to select the output of the first switch 120, in step 206. Then, the procedure ends. Thus, the composite video signal V of the first mixer 138 is selected by the second switch 144 and output to the composite video output terminal 102. The luminance signal Y and the color signal C of the first switch 120 are selected by the second switch 144 and output to the luminance output terminal 104 and the color output terminal 106, respectively.

In step 208, the microcomputer 108 switches the second switch 144 to select the output of the HD/NTSC converter 140, and ends the procedure. Here, because the present viewing mode is an HDTV mode, the HD/NTSC converter 140 outputs the luminance signal Y and color signal C of an NTSC signal converted from an HD signal to the second mixer 142 and the second switch 144. The second mixer 142 mixes the received luminance signal Y and color signal C into the composite video signal V, and outputs the composite video signal V to the second switch 144. Therefore, the composite video signal V is selected by the second switch 144 under the control of the microcomputer 108 and output to the composite video output terminal 102. The luminance signal Y and color signal C of the HD/NTSC converter 140 are selected by the second switch 144 and output to the luminance output terminal 104 and the color output terminal 106, respectively.

In step 210, the microcomputer 108 determines whether a signal received from the external input terminal 100 is a composite video signal. Upon input of the composite video signal, the microcomputer 108 switches the first and second switches 120 and 144 in steps 212–214, in the same manner as in steps 204–206, and ends the procedure. Thus, the first switch 120 outputs the luminance signal Y and color signal c separated from the external input composite video signal, and the composite video signal V, luminance signal Y, and color signal C for the external input composite video signal are output to the composite video output terminal 102, the luminance output terminal 104, and the color output terminal 106, respectively.

Upon input of a supervideo signal in step 210, the microcomputer 108 switches the first switch 120 to selectively receive the supervideo signal, and ends the procedure. Thus, the first switch 120 outputs the luminance signal Y and color signal C of the external input supervideo signal, and the composite video signal V, luminance signal Y, and color signal C of the supervideo signal are output to the composite video output terminal 102, the luminance output terminal 104, and the color output terminal 106, respectively.

Since the NTSC composite video signal V, the luminance signal Y, and the color signal C are output to the monitor output terminals 102, 104, and 106 regardless of a present viewing mode, a user can record an HDTV program in an NTSC-VTR while viewing the HDTV program in an HDTV by connecting the NTSC-VTR to the monitor output terminals 102, 104, and 106. In addition, the user can view the HDTV program in an NTSC-exclusive TV by connecting the NTSC-exclusive TV to the monitor terminal 102 or the monitor output terminals 104 and 106.

While the present invention has been described in detail with reference to the specific embodiment, it should be noted that many variations are possible by anyone skilled in the art within the scope and spirit of the present invention. Though the present invention is applied to the HDTV compatible with NTSC-TV broadcasting in the embodiment, it can be extended to the case where a video signal is not externally received. In this case, an HD tuner and an HD IF module replace the HD/NTSC tuner 114 and the HD/NTSC IF module 116, respectively, and there is no need for the first switch 120, the digital comb filter 122, the chroma processor 124, the ADC 126, the first mixer 138, and the second switch 144. The luminance signal Y and the color signal C of the HD/NTSC converter 140 are directly output to the luminance output terminal 104 and the color output terminal 106, respectively, and the composite video signal V of the second mixer 142 is. directly output to the composite video output terminal 102. Thus, the appropriate scope hereof is deemed to be in accordance with the claims as set forth below.

What is claimed is:

1. A monitor output device in an HDTV, comprising:

an HD/NTSC tuner for selectively receiving one of an HD signal and an NTSC signal according to a present viewing mode, and selecting a channel for the received signal;

an HD/NTSC IF module for converting the HD signal or the NTSC signal received from the HD/NTSC tuner to a baseband signal;

an HD decoder for, when said HD/NTSC tuner receives the HD signal, decoding the baseband output by said HD/NTSC IF module signal received from the HD/NTSC IF module and outputting a digital HD video signal;

a digital comb filter for, when said HD/NTSC tuner receives the NTSC signal, separating a luminance signal and a color signal from the NTSC signal received from the HD/NTSC IF module and outputting the luminance signal and the color signal;

a chroma processor for converting the luminance signal and the color signal received from the digital comb filter to a first output color signal;

an analog/digital converter for converting the first output color signal received from the chroma processor to a digital signal;

a format converter for selectively receiving and converting one of the outputs of the HD decoder and the analog/digital converter according to the present viewing mode to a second output color signal of a predetermined display type;

an HD/NTSC converter for converting the second output color signal received from the format converter to analog NTSC luminance and color signals;

a luminance output terminal and a color output terminal, for monitor output;

a switch for selecting one of the outputs of the digital comb filter and the HD/NTSC converter according to the present viewing mode, and outputting the selected signals to the luminance output terminal and the color output terminal; and a controller for controlling processing in the HD/NTSC tuner, the HD/NTSC IF module, the HD decoder, and the format converter, and switching the switch according to the present viewing mode.

2. The monitor output device in an HDTV as claimed in claim 1, wherein the controller controls the switch to select the luminance signal and the color signal output by the digital comb filter when the present viewing mode is an NTSC-TV mode, and to select the analog NTSC luminance and color signals of the HD/NTSC converter when the present viewing mode is an HDTV mode.

3. The monitor output device in an HDTV as claimed in claim 2, wherein the controller is a microcomputer.

4. A monitor output device in an HDTV, comprising:

an HD/NTSC tuner for selectively receiving one of an HD signal and an NTSC signal according to a present viewing mode, and selecting a channel for the received signal;

an HD/NTSC IF module for converting the HD signal or the NTSC signal received from the HD/NTSC tuner to a baseband signal;

an HD decoder for, when said HD/NTSC tuner receives the HD signal, decoding the baseband output by said HD/NTSC IF module signal received from the HD/NTSC IF module and outputting a digital HD video signal;

a digital comb filter for, when said HD/NTSC tuner receives the NTSC signal, separating a luminance signal and a color signal from the NTSC signal received from the HD/NTSC IF module and outputting the luminance signal and the color signal;

a chroma processor for converting the luminance signal and the color signal received from the digital comb filter to a first output color signal;

an analog/digital converter for converting the first output color signal received from the chroma processor to a digital signal;

a format converter for selectively receiving and converting one of the outputs of the HD decoder and the analog/digital converter according to the present viewing mode to a second output color signal of a predetermined display type;

an HD/NTSC converter for converting the second output color signal received from the format converter to analog NTSC luminance and color signals;

a first mixer for mixing the luminance signal and the color signal received from the digital comb filter, and outputting a first composite video signal;

a second mixer for mixing the analog NTSC luminance and color signals received from the HD/NTSC converter, and outputting a second composite video signal;

a composite video output terminal, a luminance output terminal, and a color output terminal, for monitor output;

a switch for selecting one of the outputs of the first and second mixers according to the present viewing mode, outputting the selected signal to the composite video output terminal, selecting one of the outputs of the digital comb filter and the HD/NTSC converter according to the present viewing mode, and outputting the selected signals to the luminance output terminal and the color output terminal; and a controller for controlling processing in the HD/NTSC tuner, the HD/NTSC IF module, the HD decoder, and the format converter, and switching of the switch according to the present viewing mode.

5. The monitor output device in an HDTV as claimed in claim 4, wherein the controller controls the switch to select the first composite video signal of the first mixer and the luminance signal and color signal of the digital comb filter when the present viewing mode is an NTSC-TV mode, and to select the second composite video signal of the second mixer and the luminance and color signals of the HD/NTSC converter when the present viewing mode is an HDTV mode.

6. The monitor output device in an HDTV as claimed in claim 5, wherein the controller is a microcomputer.

7. A monitor output device in an HDTV, comprising:

an HD/NTSC tuner for selectively receiving one of an HD signal and an NTSC signal according to a present viewing mode, and selecting a channel for the received signal;

an HD/NTSC IF module for converting the HD signal or the NTSC signal received from the HD/NTSC tuner to a baseband signal;

an HD decoder for, when said HD/NTSC tuner receives the HD signal, decoding the baseband output by said HD/NTSC IF module signal received from the HD/NTSC IF module and outputting a digital HD video signal;

a digital comb filter for, when said HD/NTSC tuner receives the NTSC signal, separating a luminance signal and a color signal from the NTSC signal received from the HD/NTSC IF module and outputting the luminance signal and the color signal;

a first switch connected to the digital comb filter, for selectively receiving one of the NTSC signal from the HD/NTSC IF module and analog composite video or supervideo signals from an external input terminal according to the present viewing mode, outputting a luminance signal and a color signal separated from the NTSC signal or the composite video signal in the digital comb filter, upon input of the NTSC signal of the composite video signal, and a luminance signal and a color signal of the supervideo signal without processing in the digital comb filter, upon input of the supervideo signal;

a chroma processor for converting the luminance and color signals received from the first switch to a first output color signal;

an analog/digital converter for converting the first output color signal received from the chroma processor to a digital signal;

a format converter for selectively receiving one of the outputs of the HD decoder and the analog/digital converter according to the present viewing mode to a second output color signal of a predetermined display type;

an HD/NTSC converter for converting the second output color signal received from the format converter to analog NTSC luminance and color signals;

a first mixer for mixing the luminance and color signals received from the first switch, and outputting a first composite video signal;

a second mixer for mixing the luminance and color signals received from the HD/NTSC converter, and outputting a second composite video signal;

a composite video output terminal, a luminance output terminal, and a color output terminal, for monitor output;

a second switch for selecting one of the outputs of the first and second mixers according to the present viewing mode, outputting the selected signal to the composite video output terminal, selecting one of the outputs of the first switch and the HD/NTSC converter according to the present viewing mode, and outputting the selected signals to the luminance output terminal and the color output terminal; and a controller for controlling processing in the HD/NTSC tuner, the HD/NTSC IF module, the HD decoder, and the format converter, and switching of the first and second switches according to the present viewing mode.

8. The monitor output device in an HDTV as claimed in claim 7, wherein the controller controls the first switch to select the NTSC signal of the HD/NTSC IF module, and the second switch to select the first composite video signal of the first mixer and the luminance and color signals of the digital comb filter when the present viewing mode is an NTSC-TV mode, controls the second switch to select the second composite video signal of the second mixer and the luminance and color signals of the HD/NTSC converter when the present viewing mode is an HDTV mode, and controls the first switch to select a signal received from the external input terminal, and the second switch to select the composite video signal of the first mixer and the luminance and color signals of the digital comb filter when the present viewing mode is an external input mode.

9. The monitor output device in an HDTV as claimed in claim 8, wherein the controller is a microcomputer.

* * * * *